United States Patent
Baek

(10) Patent No.: US 6,845,742 B2
(45) Date of Patent: Jan. 25, 2005

(54) TIMING CHAIN COVER OF ENGINE

(75) Inventor: Hong-Kil Baek, Seoul (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 10/670,885

(22) Filed: Sep. 24, 2003

(65) Prior Publication Data

US 2004/0055556 A1 Mar. 25, 2004

(30) Foreign Application Priority Data

Sep. 25, 2002 (KR) .................................. 10-2002-0058171

(51) Int. Cl.$^7$ ................................................. F02F 7/00
(52) U.S. Cl. ................................ 123/195 C; 123/90.31
(58) Field of Search ........................ 123/195 C, 198 D, 123/90.31

(56) References Cited

U.S. PATENT DOCUMENTS

| 4,373,240 A | * | 2/1983 | Castoe | 29/426.5 |
| 5,718,196 A | * | 2/1998 | Uchiyama et al. | 123/195 C |
| 6,325,033 B1 | * | 12/2001 | Iwata | 123/90.31 |

* cited by examiner

Primary Examiner—Tony M. Argenbright
Assistant Examiner—Katrina B. Harris
(74) Attorney, Agent, or Firm—Morgan Lewis & Bockius LLP

(57) ABSTRACT

A timing chain cover of an engine, where the engine adjusts the tension of the timing chain by using a tensioner formed with a ratchet bar, comprises a tool insertion hole, where a tool is inserted to loosen the timing chain, thereby separating the camshaft away from the engine without detaching the timing chain cover, obtaining an easy maintenance for the engine.

7 Claims, 4 Drawing Sheets

TIMING CHAIN COVER OF ENGINE

CROSS-REFERENCE TO RELATED APPLICATIONS

This application claims priority of Korean Application No. 10-2002-0058171, filed on Sep. 25, 2002, the disclosure of which is incorporated fully herein by reference.

FIELD OF THE INVENTION

The present invention relates to a timing chain cover of an engine and, more particularly, to a technique for improving the structure of a timing chain cover for an easy overhaul of a camshaft and valve train components.

BACKGROUND OF THE INVENTION

When a camshaft of an engine is driven by a timing chain, the timing chain should be loosened to be separated from the camshaft for overhauling the camshaft and valve train components. Conventionally, a timing chain cover embracing the timing chain is initially removed from the engine in order to detach the timing chain from the camshaft.

SUMMARY OF THE INVENTION

Embodiments of the present invention provide a timing chain cover of an engine for loosening the timing chain for adequately allowing the camshaft to be detached from the engine without breaking away the timing chain cover from the engine.

In one preferred embodiment there is provided a timing chain cover of an engine. The engine adjusts the tension of the timing chain by using a tensioner mounted with a ratchet bar. A tool insertion hole is formed for inserting a tool toward a ratchet releasing hole formed on a body of the tensioner for disengaging the ratchet state of the ratchet bar.

In one alternative embodiment, a timing chain cover for an engine comprises a cover member defining a tool insertion hole. The tool insertion hole is formed around a common axis with a ratchet release hole when said cover member covers the timing chain. The cover member, when in place, covers a timing chain tensioner having a ratchet bar for tensioning the timing chain. The ratchet release hole provides access on the tensioner for a tool to release the ratchet bar. Preferably, a threaded plug is provided for the tool insertion hole, which has a threaded wall to mate with the plug.

In another alternative embodiment of the present invention, a timing chain cover and associated tensioning mechanism comprise a tensioner arm, a tensioner and a cover member. The tensioner arm is disposed to bear against the timing chain. A hydraulically controlled tensioner includes a flange acting on the tensioner arm and a ratchet bar cooperating with the flange to control release of the flange. The tensioner has a body that defines a ratchet release hole, whereby the ratchet bar may be released by insertion of an elongated tool. The cover member is configured and dimensioned to cover the tensioner, the tensioner arm and the timing chain. The cover member defines a tool insertion hole formed around a common axis with the ratchet release hole. Again, preferably, a threaded plug is provided for the tool insertion hole, which has a threaded wall to mate with the plug.

BRIEF DESCRIPTION OF THE DRAWINGS

For fuller understanding of the nature and objects of the present invention, reference should be made to the following detailed description taken in conjunction with the accompanying drawings in which.

DETAILED DESCRIPTION OF THE INVENTION

Hereinafter, the preferred embodiment of the present invention will be described in detail with reference to the accompanying drawings.

Figure 1:
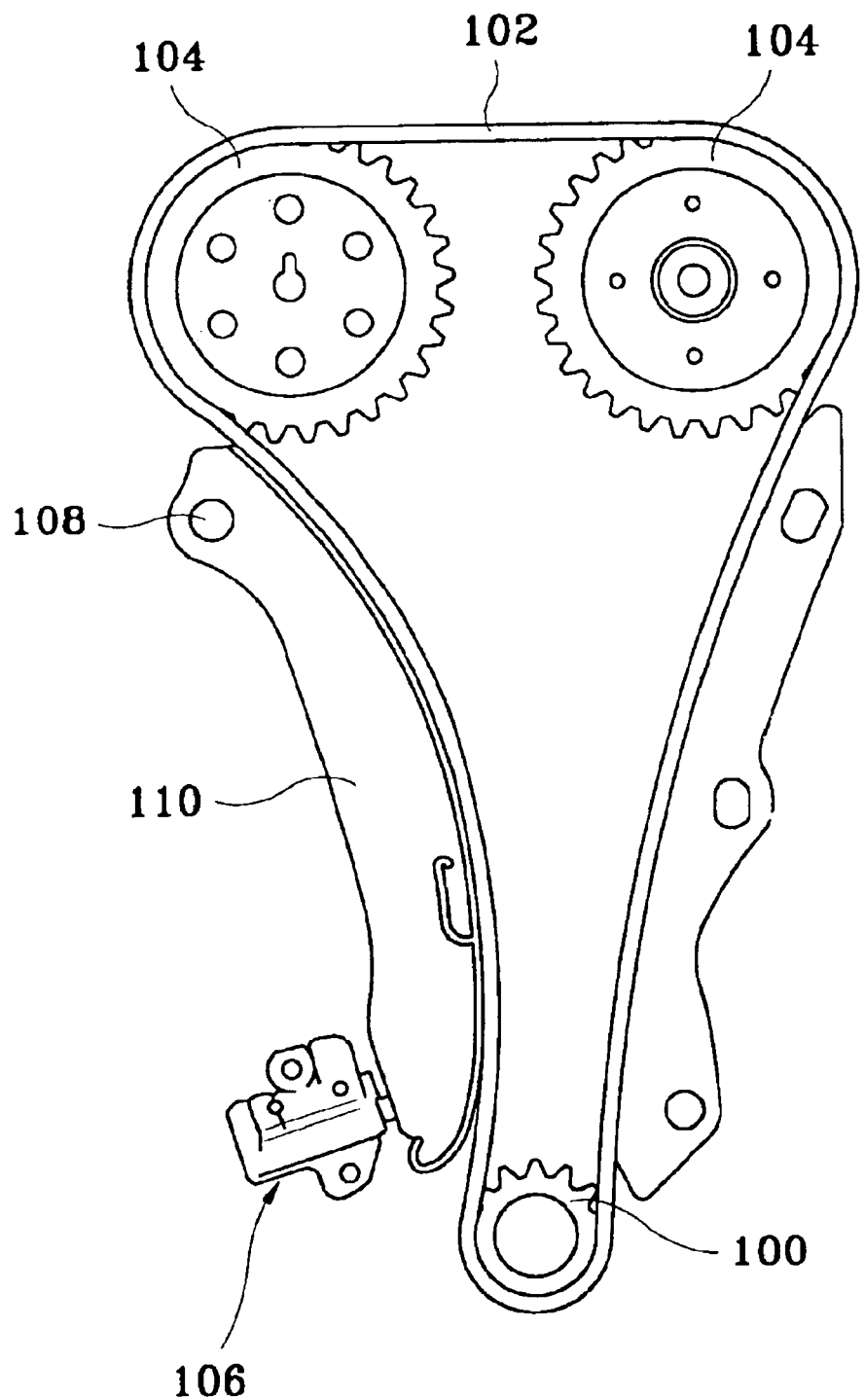
FIG. 1 illustrates an installation state of a timing chain of an engine according to an embodiment of the present invention.

FIG. 1 illustrates an embodiment of a timing chain of an engine maintaining proper tension via a tensioner formed with a ratchet bar. The embodiment shown in FIG. 1 is designed to transmit power provided from a crankshaft sprocket 100 to camshaft sprockets 104 by using a timing chain 102. A tensioner 106 is mounted for properly adjusting the tension of the timing chain 102. The tensioner 106 adjusts the tension of the timing chain 102 via a tensioner arm 110 pivotally mounted with a hinge axis 108 as a turning axis.

The tensioner 106 pushes the tensioner arm 110 by oil pressure fed from an oil pressure supply source (not illustrated). As the tensioner arm 110 turns in relation to the hinge axis 108 to push the timing chain 102, the tension of the timing chain 102 is adjusted.

Figure 2:
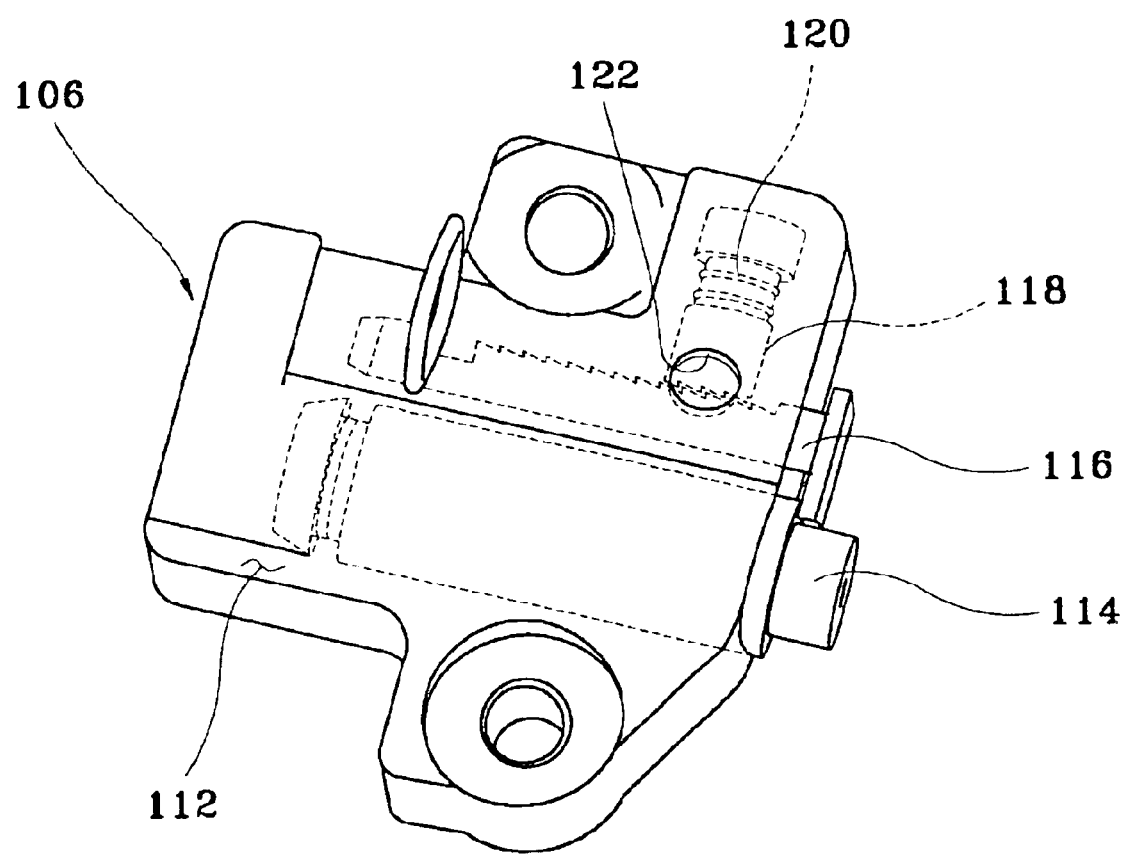
FIG. 2 illustrates a structure of a tensioner mounted in FIG. 1.

As shown in FIG. 2, the tensioner 106 includes a body 112. A plunger 114 protrudes from the body 112 by oil pressure provided through the body 112 for pushing the tensioner arm 110. A ratchet bar 116 is formed to limit sliding movement of the plunger 114 protruding from the body 112 for stabilizing the tension of the timing chain 102. A ratchet piston 118 is meshed to a lateral side of the ratchet bar 116 for preventing the ratchet bar 116 from receding while the ratchet bar 116 projects from the body 112. A ratchet spring 120 resiliently supports the ratchet piston 118 for allowing the ratchet piston 118 to be compressed to the lateral side of the ratchet bar 116. A ratchet releasing hole 122 is formed at an external surface of the body 112 to provide access for pushing the ratchet piston 118 from the lateral side of the ratchet bar 116.

Thus, the tensioner 106 is so designed as to push the tensioner arm 110 by the plunger 114 protruding from the body 112 by oil pressure provided through the body 112. When the plunger 114 protrudes from the body, the ratchet bar 116 also protrudes for a predetermined length via the plunger 114. This protruding structure of the ratchet bar 116 can be sustained and prevented from being receding by operation of the ratchet piston 118 and the ratchet spring 120.

When the timing chain 102 is gradually loosened as a result of the wear caused on the engine, the ratchet bar 116 and the plunger 114 gradually protrudes according to the change in the timing chain 102 for properly adjusting the tension of the timing chain 102. The ratchet bar 116 hinders the plunger 114 from excessively receding inside the tensioner, thereby obtaining a stable tension of the timing chain 102.

Figure 3:
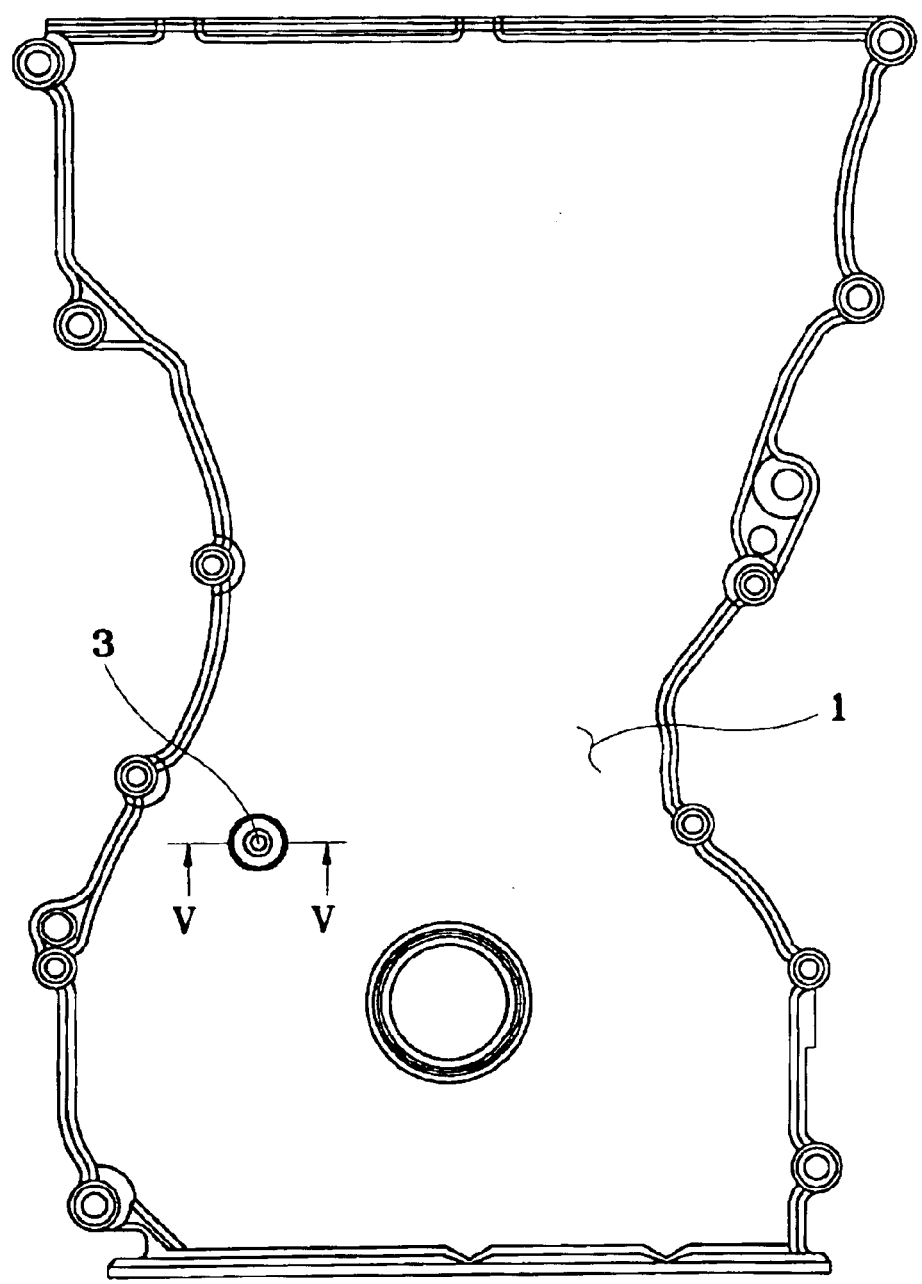
FIG. 3 illustrates a timing chain cover of an engine according to the embodiment of the present invention.
Figure 4:
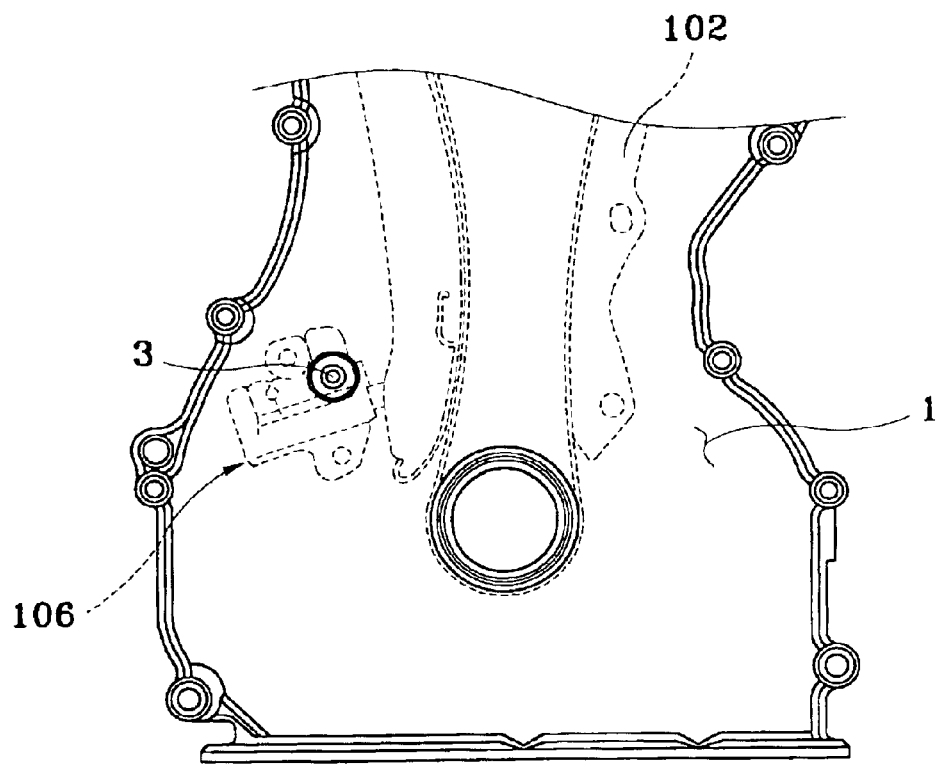
FIG. 4 illustrates a timing chain cover mounted at an engine according to the embodiment of the present invention.

In an engine using the timing chain 102 thus described, the timing chain 102 should be loosened to be separated from the camshaft for an overhaul. With reference to FIG. 3, a tool insertion hole 3 is formed in the timing chain cover 1 to allow a tool to be inserted into a ratchet releasing hole 122 of the tensioner 106 when covered by the timing chain cover 1 for disengaging the ratchet state of said ratchet bar 116. The tool insertion hole 3 according to an embodiment of the present invention and the ratchet releasing hole 122 of the tensioner 106 are formed along the same concentric axis. The tool insertion hole 3 into which a tool such as a screwdriver having a linear rod shape is inserted from the external surface of the timing chain cover 1 thus provides for easy maintenance.

Figure 5:
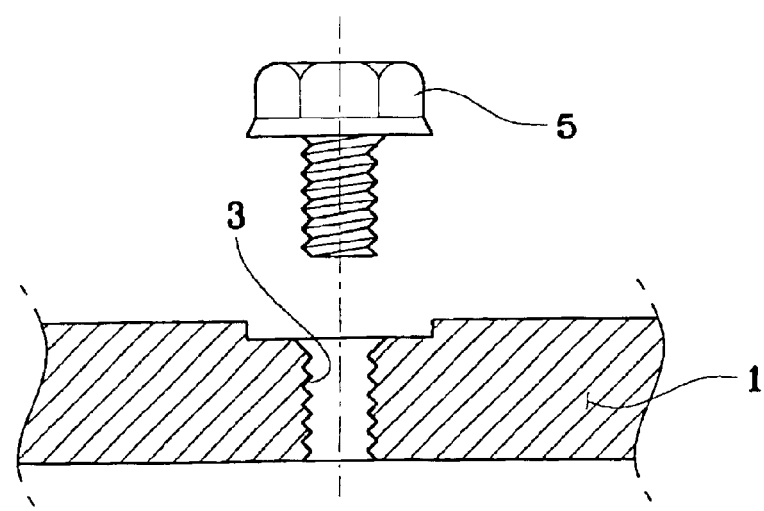
FIG. 5 is a cross-sectional view taken along line V—V of FIG. 3 for illustrating a bolt plug and a tool insertion hole.

The tool insertion hole 3 is normally sealed by a bolt plug 5, as shown in FIG. 5. The bolt plug 5 is removed for operating the ratchet releasing hole 122 of the tensioner 106 via a screwdriver or the like during a vehicle overhaul. Following the completion of the overhaul, the tool insertion hole 3 is sealed again with the bolt plug 5.

The operation of the embodiment of the present invention thus constructed will be described below.

The camshaft is separated from the engine for an overhaul or maintenance of the camshaft or valve train components in the following steps. A screwdriver or a similar tool is inserted into the tool insertion hole 3 of the timing chain cover 1 after removing the bolt plug 5. The ratchet piston 118 of the tensioner 106 is slid through the ratchet releasing hole 122 of the tensioner 106 for disengaging the ratchet bar 116 from the ratchet state. The timing chain 102 is pressed between two camshaft sprockets 104 with a slight pressure by an operator's hand or the like. The ratchet bar 116 recedes back to the inner side of the body 112 of the tensioner 106 by the pressure added onto the timing chain 102 thus described, and the timing chain 102 is detached from the camshaft sprockets 104.

Of course, there is no oil pressure provided into the tensioner 106 while the engine is under overhaul, enabling the plunger 114 to recede back to the inner side of the body 112 of the tensioner 106.

There is an advantage in the present invention in that an operator can loosen the timing chain 102 to separate the camshaft via a simplified operation, greatly improving the maintenance of the camshaft and valve train components.

There is another advantage in that after a vehicle overhaul, the bolt plug 5 sealing the tool insertion hole 3 prevents generation of noise from the inner side of the timing chain cover 1 and prevents impurities from entering into the timing chain cover 1.

As apparent from the foregoing, a timing chain cover of an engine according to the present invention, where the engine adjusts the tension of the timing chain by using a tensioner formed with a ratchet bar, comprises a tool insertion hole, where a tool is inserted to loosen the timing chain, thereby separating the camshaft away from the engine without detaching the timing chain cover and resulting in an easy maintenance for the engine.

What is claimed is:

1. A timing chain cover of an engine, wherein the engine adjusts the tension of a timing chain using a tensioner mounted with a ratchet bar, and said cover comprises a tool insertion hole formed for inserting a tool toward a ratchet releasing hole formed in a body of said tensioner for disengaging said ratchet bar;

wherein said tool insertion hole and said ratchet releasing hole of said tensioner are formed along the same concentric axis.

2. The timing chain cover as defined in claim 1, wherein a bolt plug is detachably mounted to said tool insertion hole.

3. A timing chain cover for an engine wherein the engine includes a timing chain tensioner having a ratchet bar for tensioning the timing chain and defining a ratchet release hole providing access for a tool to release the ratchet bar, said cover comprising a cover member defining a tool insertion hole wherein said tool insertion hole is formed around a common axis with the ratchet release hole when said cover member covers the timing chain.

4. The timing chain cover of claim 3, further comprising a threaded plug wherein said tool insertion hole has a threaded wall to mate with said plug.

5. A timing chain cover and tensioning mechanism, comprising:

a tensioner arm disposed to bear against a timing chain;

a hydraulically controlled tensioner including a flange acting on said tensioner arm and a ratchet bar cooperating with said flange to control release of said flange, said tensioner having a body defining a ratchet release hole; and a cover member configured and dimensioned to cover said tensioner, tensioner arm and the timing chain, said cover member defining a tool insertion hole formed around a common axis with said ratchet release hole.

6. The timing chain cover of claim 5, further comprising a threaded plug wherein said tool insertion hole has a threaded wall to mate with said plug.

7. A timing chain cover, comprising:

a timing chain cover defining an insertion hole therethrough; and a tensioner mechanism having a body housing said tensioner mechanism, said body defining a ratchet releasing hole;

wherein said ratchet releasing hole and said insertion hole are aligned along a common axis such that a tool can be inserted therethrough for manipulation of a ratchet bar of said tensioner mechanism.

* * * * *